United States Patent
Mitchell et al.

(10) Patent No.: US 10,239,009 B2
(45) Date of Patent: Mar. 26, 2019

(54) CONTINUOUSLY-OPERABLE FLOW STREAM PROCESSING SYSTEM AND METHOD

(71) Applicants: Mark A. Mitchell, Dublin, CA (US); Brian Anderson, Lodi, CA (US)

(72) Inventors: Mark A. Mitchell, Dublin, CA (US); Brian Anderson, Lodi, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 765 days.

(21) Appl. No.: 13/827,855

(22) Filed: Mar. 14, 2013

(65) Prior Publication Data

US 2014/0263085 A1    Sep. 18, 2014

(51) Int. Cl.
| | |
|---|---|
| *B01D 29/00* | (2006.01) |
| *B01D 29/60* | (2006.01) |
| *B01D 29/66* | (2006.01) |
| *B01D 46/18* | (2006.01) |
| *B01D 46/00* | (2006.01) |

(52) U.S. Cl.
CPC .......... *B01D 46/18* (2013.01); *B01D 46/0058* (2013.01)

(58) Field of Classification Search
CPC ........ B01D 29/00; B01D 29/60; B01D 29/66; B01D 29/0075; B01D 29/606; B01D 46/18; B01D 46/0058
USPC ....... 210/739, 741, 420, 134, 767, 791, 797, 210/798
See application file for complete search history.

(56) References Cited

U.S. PATENT DOCUMENTS

| | | | |
|---|---|---|---|
| 4,454,427 A | 6/1984 | Sosnowski et al. |
| 5,019,257 A | 5/1991 | Suzuki et al. |
| 5,024,054 A | 6/1991 | Barris et al. |
| 5,358,552 A | 10/1994 | Seibert et al. |

(Continued)

FOREIGN PATENT DOCUMENTS

| | | |
|---|---|---|
| EP | 0295 335 A2 | 12/1988 |
| EP | 0857 508 A1 | 12/1998 |

(Continued)

OTHER PUBLICATIONS

Bergman, et al., "Further Development of the Cleanable Steel HEPA Filter, Cost/Benefit Analysis, and Comparison with Competing Technologies", UCRL-JC-127233, 36 pages (Jan. 1997).

*Primary Examiner* — Robert Clemente
*Assistant Examiner* — Akash K Varma
(74) *Attorney, Agent, or Firm* — James S. Tak

(57) ABSTRACT

A continuously-operable flow stream processing system and method has two or more fluid processing media arranged in a fluid conduit network to provide alternate flow paths for a flow stream to be processed (e.g. filtered). Valves and other flow control devices, e.g. controller module and sensors, are used to redirect the flow stream from one or more service-needed fluid processing media to service-ready fluid processing media without taking the system offline to remove, repair, replace, clean in situ, or otherwise service the service-needed fluid processing media, so that the system may operate continuously to process the flow stream without stoppage. Redirection into alternative flow paths and media may be automatically implemented based on a predetermined threshold or trigger condition, such as may be detected by sensors directly or indirectly monitoring media condition.

6 Claims, 11 Drawing Sheets

(56) References Cited

U.S. PATENT DOCUMENTS

| | | | |
|---|---|---|---|
| 5,439,659 A | 8/1995 | Izumo | |
| 5,494,591 A | 2/1996 | Stamm et al. | |
| 5,628,916 A * | 5/1997 | Stevens | B01D 24/002 |
| | | | 210/798 |
| 5,714,676 A | 2/1998 | Hase | |
| 6,152,133 A | 11/2000 | Psaros et al. | |
| 6,290,846 B1 * | 9/2001 | Hangmann | B01D 29/05 |
| | | | 210/236 |
| 6,402,822 B1 * | 6/2002 | Najm | B01D 46/0086 |
| | | | 55/351 |
| 6,524,369 B1 | 2/2003 | Krigmont | |
| 6,569,217 B1 | 5/2003 | DeMarco | |
| 6,629,375 B2 | 10/2003 | Mallsion et al. | |
| 6,679,672 B1 | 1/2004 | Barrows | |
| 6,709,586 B2 | 3/2004 | Mason | |
| 6,716,261 B2 | 4/2004 | Carroll et al. | |
| 6,830,714 B1 | 12/2004 | Avontuur et al. | |
| 6,936,085 B2 | 8/2005 | DeMarco | |
| 7,073,392 B2 | 7/2006 | Lull et al. | |
| 7,195,659 B2 | 3/2007 | Sporre et al. | |
| 7,481,919 B1 * | 1/2009 | Keenan | F02M 37/0047 |
| | | | 210/110 |
| 2006/0032200 A1 | 2/2006 | Karlebratt | |
| 2006/0112941 A1 | 6/2006 | Hilpert et al. | |
| 2006/0285117 A1 | 12/2006 | Shen | |
| 2011/0017681 A1 * | 1/2011 | Bibey | B29C 47/0016 |
| | | | 210/791 |

FOREIGN PATENT DOCUMENTS

| | | |
|---|---|---|
| WO | 99 10633 A1 | 3/1999 |
| WO | 2005011460 A1 | 2/2005 |

* cited by examiner

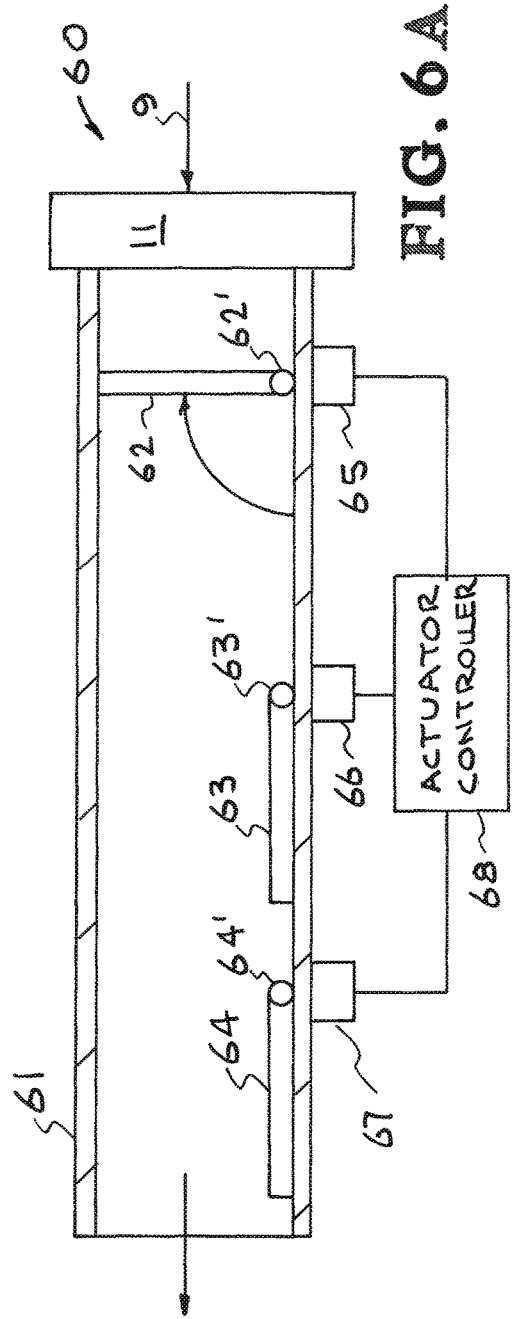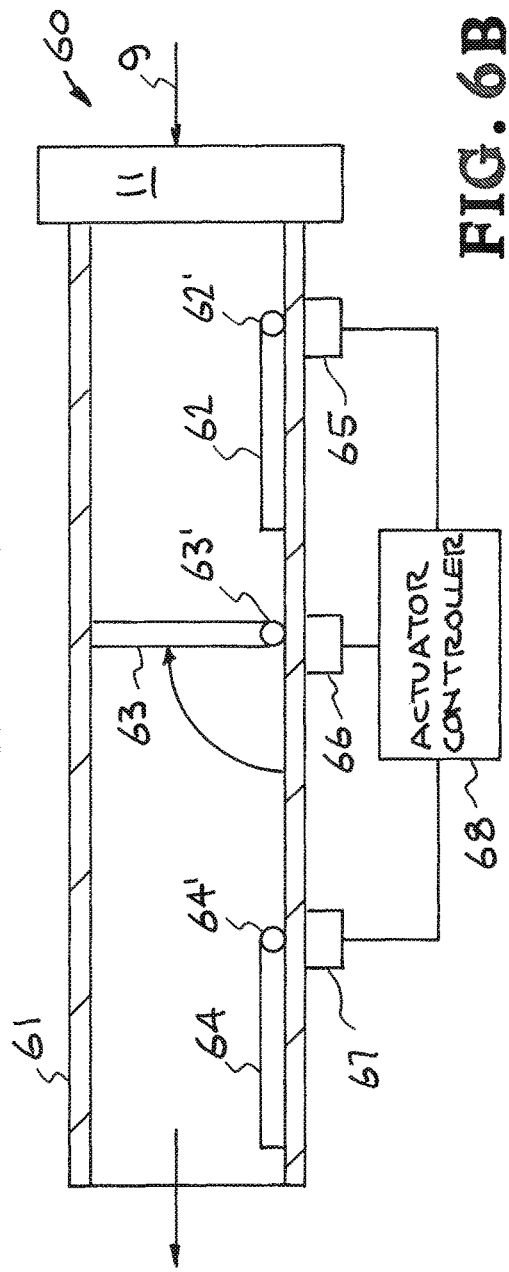

CONTINUOUSLY-OPERABLE FLOW STREAM PROCESSING SYSTEM AND METHOD

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to fluid processing systems, and more particularly to a continuously-operable flow stream processing system and method adapted to redirect the flow stream from a service-needed fluid processing media, to a service-ready fluid processing media, so as to operate continuously to process the flow stream without stoppage.

BACKGROUND OF THE INVENTION

Filters (such as for example HEPA filters) are used to remove airborne particulates and/or remove and/or treat gases from a gas stream (e.g., air). Filters plug during use, e.g., during process operations involving particulates or during a fire. Clogging of filters is especially problematic during fire scenarios due to the large amount of soot and other particulate that can clog a HEPA filter. Likewise, reactive mediums in a gas stream become deactivated during/after prolonged use. Removal, replacement, or cleaning of filters and/or reactive medium typically requires shutting down a gas stream (e.g., ventilation system or process gas stream) which is disruptive, and may be harmful, impact production/productivity, or have other risks and/or costs associated with the disruption.

SUMMARY OF THE INVENTION

One aspect of the present invention includes a continuously-operable flow stream processing system, comprising: a fluid inlet for receiving a flow stream into the system; at least two fluid processing media; and means in fluidic communication with the fluid inlet and the fluid processing media for redirecting the flow stream from service-needed fluid processing media to service-ready fluid processing media without taking the system offline to service the service-needed fluid processing media, whereby the system may operate continuously to process the flow stream without stoppage.

Another aspect of the present invention includes a method of continuously processing a flow stream comprising: providing a fluid inlet for receiving a flow stream, and at least two fluid processing media in fluidic communication with the fluid inlet and capable of processing the flow stream; and redirecting the flow stream from service-needed fluid processing media to service-ready fluid processing media without taking the system offline to service the service-needed fluid processing media, whereby the system may operate continuously to process the flow stream without stoppage.

Generally, the present invention is directed to a continuous-operation or continuously-operable flow stream processing system and method having the ability to remove, replace, clean, or otherwise service fluid processing media (e.g. an air/particulate filter) while the system remains online and continues to operate and process the flow stream without stoppage or downtime. The fluid that is processed by the system of the present invention can be various types of gases or liquids, including for example, air, water, petroleum, oil, chemical feedstock, drugs, etc. Moreover, the gases could be radioactive, hazardous, or valuable gases and the fluids could contain radioactive, hazardous, or valuable particulates. And the fluid processing capable of being performed by the media used in the present invention typically involves changing the physical, chemical, or even electrical properties of the fluid of the flow stream, such as by, for example, filtration, size selection or segregation or discrimination, thermal treatment, chemical treatment (e.g. catalytic reaction), adsorption, absorption, "physisorption", adding or subtracting material (e.g. particles or chemicals) to the flow stream. As such, the fluid processing media used in the present invention can be various types of media adapted to perform any of said fluid processing methods, including, for example, particulate filters (e.g. HEPA, ceramic, clean room, sub-HEPA, or process filters), and fluid treatment materials such as reactive and catalytic materials. Furthermore, the fluid processing media of the present may be used by themselves as the primary fluid processing media, or used in conjunction with other processing media of existing processing systems, e.g. placed in front of other processing media to perform a pre-processing function (e.g. pre-filtration of a HEPA filter).

FIG. 1 shows a schematic view of a general embodiment of the system of the present invention, generally indicated at 10, having a fluid inlet 11 for receiving a fluid flow stream 9 into the system, at least two fluid processing media (three representative media shown at 13-15) positioned downstream of the fluid inlet, and a fluid conduit or conduits of a fluid conduit network (not shown in FIG. 1) physically connecting the fluid inlet to the media. The fluid conduit or conduits of the fluid conduit network may be a tube, pipe, channel, or any other structure defining a fluidic pathway to convey fluid. These fluid conduit networks may include microfluidic conduits, micro-flow and processing systems, and/or micro-reactors. And the system 10 also includes the various mechanisms, devices, and implements known in the art (e.g. any combination of valves, actuators, pumps, sensors, control electronics including signal processors, other hardware, software, etc. for controlling flow) of a flow control system, generally indicated at 12, used to continuously direct and redirect the flow stream through various alternative fluid pathways of the fluid conduit network so that the flow stream may be processed by at least one fluid processing media at all times. And it is appreciated that while the outlets of each of the media-containing fluid conduits are shown as being separate, they could also merge back and be combined into a single outlet and flow channel. Furthermore, each the outlets could be the inlet for another downstream process, or recirculated back to the fluid inlet 11 (e.g. as is the case of a recirculating reactor or a stir tank).

In particular, the flow control system 12 and the particular arrangement of conduits of the fluid conduit network function together to redirect (e.g. selectively switch) the flow stream 9 from one or more in-service fluid processing media, e.g. 13, currently processing fluid but which may be in a condition requiring some manner of service (e.g. replacement or cleaning), to one or more offline service-ready fluid processing media, e.g. 14, so as to bring the offline media online, without taking the system offline to service the service-needed fluid processing media. In this manner, in-service media may be taken offline so as to be serviceable (i.e. capable of being accessed whether or not the media has been used, or not used, or is actually removed, replaced, or cleaned) while the rest of the system continues to process the flow stream. Additional fluid processing media, e.g. 15, may be provided and available either as additional in-service media currently in operation together with media 13, or as additional offline media which may or may not be service ready or is in the process of becoming service ready.

Furthermore, the flow control system 12 of the system may be particularly adapted and/or configured for either manual operation, or automatic operation based on a predetermined threshold or trigger condition. In the case of manual operation, the flow control system may include a manually operable switch or actuator operably connected to one or more valves to cause flow redirection from one processing media to another when effected by a human operator. In this case, the step of redirecting the flow stream from one media to another may be based on, for example, a predetermined maintenance schedule. In the case of automatic operation, however, the flow control system (and in particular a control module of the flow control system) may be particularly adapted and/or configured to operate based on either sensor-based monitoring, or non-sensor-based parameters. For non-sensor-based automatic operation in particular, the flow control system may include a timer, for example, and the flow stream automatically redirected between media in alternating fashion based on a preset time interval.

In the case of automatic/automated operation based on sensor-based monitoring, one or more sensors, such as generally shown at 16-18 in FIG. 1, may be provided per fluid processing media and arranged to monitor the fluid processing media. The sensors 16-18 are shown schematically connected to the flow control system 12 (and in particular to a control module thereof) so that the flow control system 12 may redirect/switch the flow stream between alternate fluid processing media (e.g. and between alternate flow conduits leading to the alternate media) based on the signals received from the sensors. In particular, the flow control system 12 may be adapted to selectively switch the flow stream from a currently online fluid processing media (and associated fluid conduit leading to said media) to a currently offline fluid processing media (and associated fluid conduit leading to said media) based on a predetermined threshold condition or other set-point criteria detected by the sensors warranting taking the currently online fluid processing media offline for servicing. For example, upon satisfying the threshold condition, a valve or valves may be actuated to open the fluid flow to another service-ready media(s). Additionally, a valve or valves may also be actuated to close-off the fluid flow through the previously online service-needed media(s).

Furthermore, it is appreciated that monitoring the fluid processing media includes both direct and indirect monitoring methods, which although may detect/monitor different parameters (e.g. physical, chemical, electrical, temperature, etc.), ultimately serves to determine the operational status of the media, e.g. whether service is needed or not. Direct monitoring of media includes, for example, monitoring media properties, e.g. media weight, temperature, spectral properties, UV, visible, FTIR, XRF, etc. And indirect monitoring includes monitoring flow stream parameters which are indicative of the operational status of the media, with examples including comparing upstream (of media) and downstream (of media) values of various parameters e.g. pressure differential, percentage particulate, particulate size, temperature, chemical composition (by gas chromatography or mass spec, GC-MS, LC-MS, FTIR, Raman scattering, UV, visible spectrometry, X-ray fluorescence, etc.). In this regard, various types of sensors designed to detect such parameters may be used and particularly positioned relative to the fluid processing media. In one example for measuring pressure differential, the sensors may be for example pressure gauges for monitoring a pressure differential across the fluid processing media, and the predetermined threshold condition is a predetermined pressure drop. It is appreciated that two (or more) sensors (upstream, downstream) may be used for indirect monitoring, or in the alternative a single downstream sensor may be used for comparison against a known value upstream of the media.

The advantage of a system's ability to redirect the flow stream to a service-ready fluid processing media from a service-required fluid processing media for continuous operation according to the present invention, can be illustrated for example in the case of a ventilation system during a fire. Due to the large amount of soot and other airborne particulates produced during a fire, a ventilation system's filters, e.g. HEPA filters, can quickly become clogged and ineffective. However, by redirecting the air flow from the clogged filter to a second unclogged, service-ready filter, the system of the present invention may continue to operate during the fire to mitigate the danger. A similar operational advantage may be realized for gas processing systems (e.g. gas separation systems) which remove particulates and/or remove and/or treat gases or otherwise process gas streams, such as for example, with reactive and/or catalytic medium. By redirecting flow of such gas streams from a gas treatment media requiring some form of service, to a service-ready media, the system may continue to operate without stoppage. Likewise, similar operational advantage may be realized for other fluid processing systems which remove particulates and/or remove and/or treat fluids or otherwise process fluid streams, such as for example, with reactive and/or catalytic medium. The utility of such ability to redirect the flow stream can be appreciated in ongoing applications as well as accident scenarios such as fires. Ongoing applications include applications where routine, or non-routine but periodic, clogging or other diminished performance capacity of the media is an inherent part, or anticipated side-effect, of process operations.

Another advantage of a system's ability to redirect the flow stream to a service-ready fluid processing media from a service-required fluid processing media for continuous operation according to the present invention, is that the now offline service-required fluid processing media may be cleaned in situ and returned to service so as to reduce waste costs and contamination risk, while the system continues to process the flow stream. In one embodiment of the present invention, an in situ cleaning arrangement is provided for first redirecting flow from an online service-needed media to another offline service-ready media, so as to take the service-needed media offline and segregated from the flow stream. The arrangement includes a flow diverter which is used to establish fluid communication between the service-need media and both (1) a material separator/collector, and (2) a material removal mechanism, apparatus, device, or other implement for removing material that may have been collected, or formed, or is otherwise present on the media which reduces the processing ability or efficacy of the media (e.g. a backpulsing system including injector and cleaning fluid), if not already operably connected to the service-needed media. The flow diverter may also be used to switch off fluidic communication with the flow stream if not already switched off by a separate valve or mechanism.

Next, material (e.g. collected particles/debris from a filter) is removed from the offline media using the material removal mechanism, which may involve removal by, for example, physical agitation (backpulsing, tapping, vibration), by electrostatic agitation, by thermal treatment (heating or cooling), by chemical treatment (using solvents, surfactants, chemical peel), etc. And finally, the removed/flushed material is collected (e.g. with a separator) from the offline fluid processing media. The method of collection may employ, for example, a vacuum source connected to the separator for pumping the removed material into the separator, or even simply gravity. And various types of separators and separation arrangements may be used, including for example a cyclone separator, or another removal mechanism (e.g., piping, waste drum, secondary HEPA filters).

The continuously-operable flow processing system of the present invention may be used, installed, and/or incorporated in ventilation/HVAC systems (e.g. glove box, hot cell, fume hood, room exhaust, facility exhaust, or inlet), process gas systems, test systems (e.g. for R&D purposes), and other systems that otherwise process fluids, flow streams, or particulate-laden flow streams, and that has use in a number of industries and facilities, including for example bio-tech, pharmaceutical manufacturing, food processing, chemical processing (e.g. (including powder, wet-chemistry), semiconductor fabrication, wastewater treatment, mining, clean coal power generation, hazardous material processing, radioactive material processing, nuclear power generation (nuclear reactors), nuclear fuel testing, nuclear fuel storage, radiological facilities, aerospace, defense industries, and petroleum processing.

BRIEF DESCRIPTION OF THE DRAWINGS

The accompanying drawings, which are incorporated into and form a part of the disclosure, are as follows.

FIG. 6A is a schematic view of another example embodiment of the continuously-operable fluid processing system of the present invention having three representative fluid processing media serially arranged in a conduit so as to be actuable between online and offline positions, with only one of the media in an online position.

FIG. 6B is a schematic view following FIG. 6A after the previously online media is actuated to an offline position and a second media is actuated to the online position.

DETAILED DESCRIPTION

Figure 1:
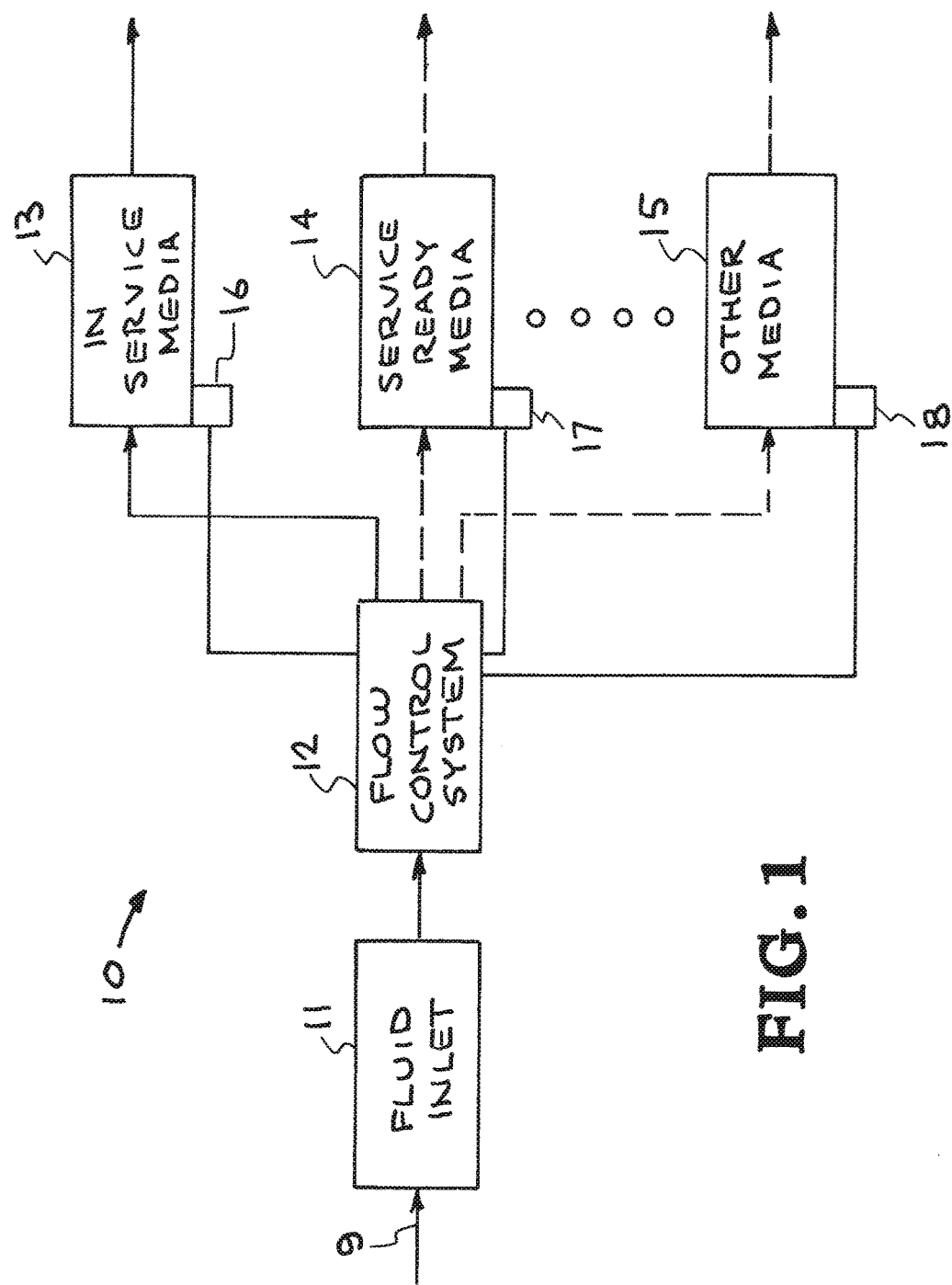
FIG. 1 is a schematic view of a general embodiment of the continuously-operable fluid processing system of the present invention.
Figure 2:
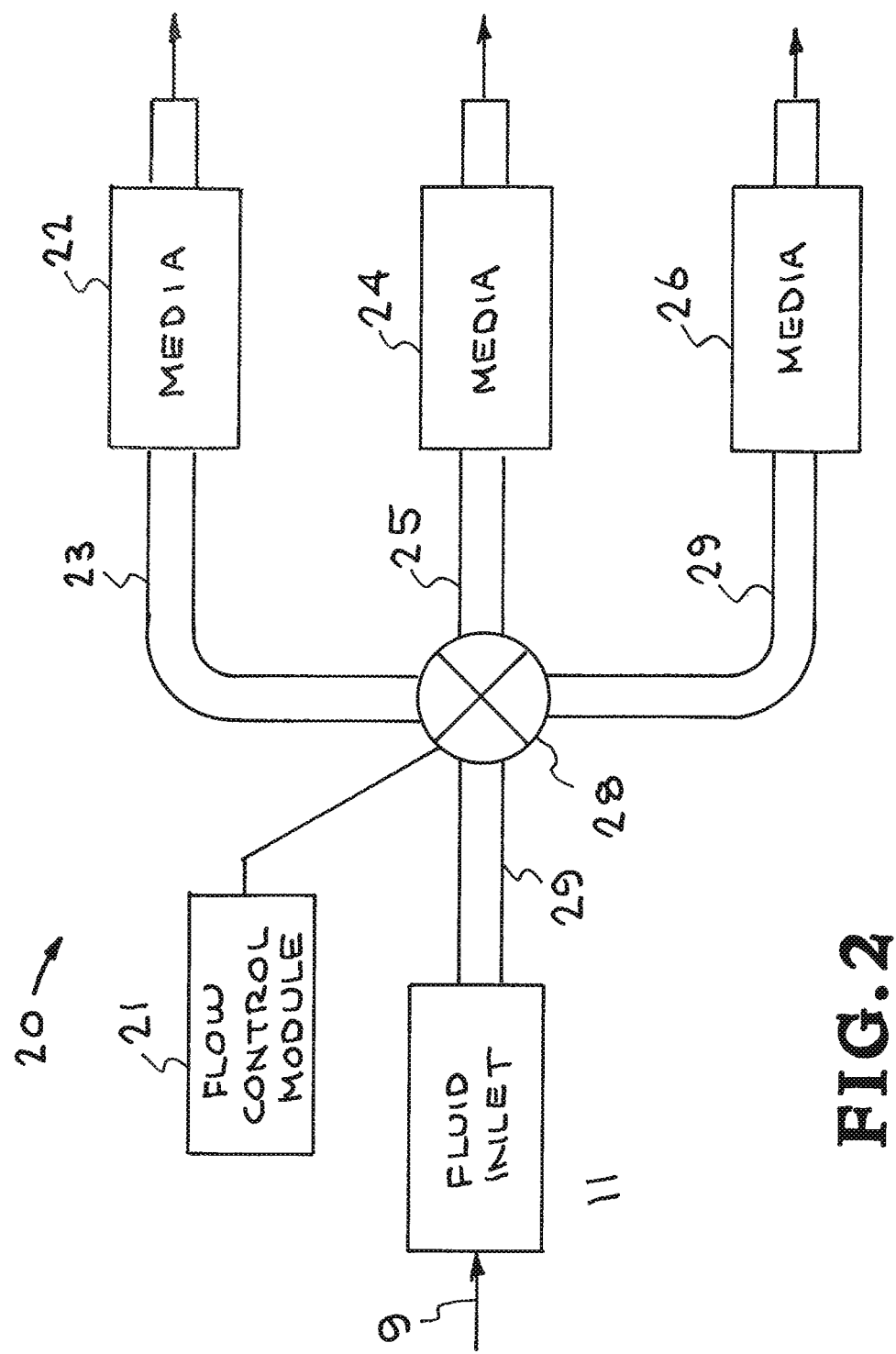
FIG. 2 is a schematic view of an example embodiment of the continuously-operable fluid processing system of the present invention using a three-way diverter valve to direct fluid flow between three representative fluid processing media arranged in parallel.

Turning now to the drawings, FIG. 2 shows a schematic view of an example embodiment of the continuously-operable fluid processing system of the present invention, generally indicated at 20, using a three-way diverter valve 28 to direct a flow stream 9 entering the system via fluid inlet 11 to one of three representative fluid processing media 22, 24, and 26 arranged in parallel. In particular, the media 22, 24, 26 are located in respective fluid conduits 23, 25, and 29 which are connected to and branch from the fluid inlet 11 via the three-way diverter valve 28 and a main conduit 29 fluidically connecting the inlet 11 to the valve 28. Furthermore, a flow control module 21 is shown connected to the valve 28 to actuate the valve and selectively switch/divert the flow stream into one of the conduits 23, 25, and 29 so that one of the three media is online and processing the flow stream at any given time while the other two remain offline and serviceable. In this manner, the flow control module 21, the valve 28 and the fluid conduit network (including the three branching conduits 23, 25, and 29) together serve to redirect the flow stream from a service-needed fluid processing media to a service-ready fluid processing media without taking the system offline. It is appreciated that while a single three-way diverter valve 28 is described, a single n-way diverter valve connecting to each of n fluidic conduits to the common fluid inlet may be used.

Figure 3:
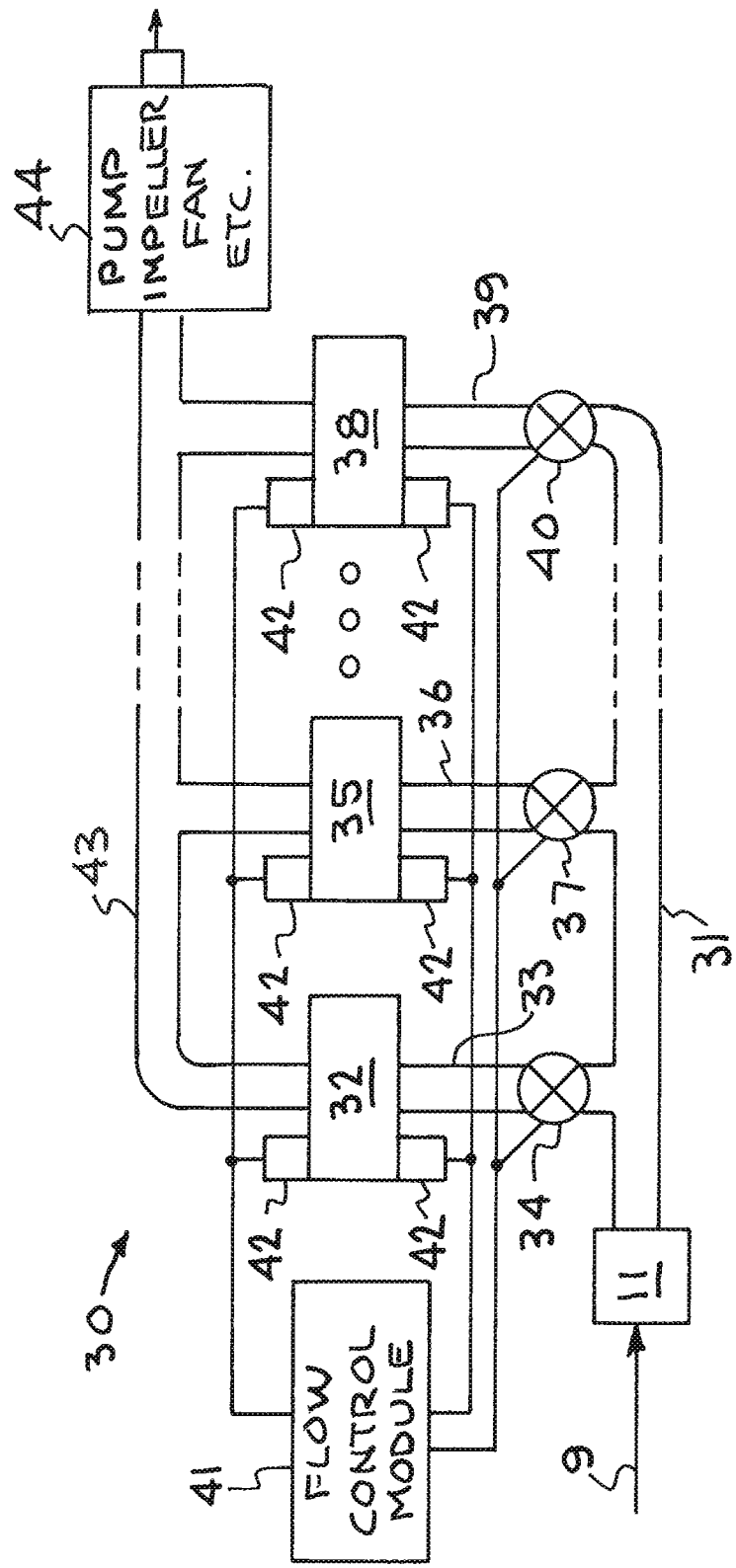
FIG. 3 is a schematic view of another example embodiment of the continuously-operable fluid processing system of the present invention having three representative fluid processing media arranged in parallel, with flow to each media controlled by separate and independently operable valves.

FIG. 3 shows another example embodiment of the continuously-operable fluid processing system of the present invention, generally indicated at 30, and having three representative branching conduits 33, 36, and 39 branching from and in fluidic communication with the fluid inlet 11 via a common main conduit 31, similar to the parallel arrangement of FIG. 2. The branching conduits 33, 36, and 39 are also shown converging downstream of the media into a common flow source 44, such as for example a pump, fan, impeller, etc. In the alternative, separate independent flow sources may be connected to each conduit to provide greater flow control through the conduit network. And in each conduit 33, 36, and 39 there is positioned a fluid processing media 32, 35, and 38, respectively, to process the flow stream 9 or a portion thereof entering the system through the inlet 11 and into one or more of the conduits. Furthermore, access into conduit 33 and to media 32 is controlled by valve 34, access into conduit 36 and to media 35 is controlled by valve 37, and access into conduit 39 and to media 38 is controlled by valve 40. And a flow control module 41 is shown connected to the valves 34, 37, and 40 to control valve actuation (e.g. between open and closed positions) and selectively switch/divert the flow stream into one or more of the conduits 33, 36, and 39 so that at least one media is online and processing the flow stream at any given time while at least one other media remains offline and serviceable.

Also shown in FIG. 3 is a pair of sensors 42 per media provided at upstream and downstream locations of each media to monitor the media, and connected to the flow control module 41 to provide the flow control module with measured values indicating media status. For example, the sensors 42 may be pressure differential gauges which monitor the pressure drop across the media. Furthermore, the flow control module 41 may be adapted/configured to determine that a currently online fluid processing media is in need of servicing based on a predetermined threshold condition detected by the sensors 42, e.g. when the pressure drop across the media reaches a set-point criteria. And based on the determination, the flow control module 41 actuates open a valve associated with another different and presently offline conduit and associated service-ready media, to redirect the flow stream 9 into the newly accessible conduit and media. Additionally, the valve of the service-needed media may also be actuated to close off the flow stream therethrough and take the media offline so as to be serviceable. In this manner, the flow control module 41, the valves 34, 37, 40 and the flow conduit network (including conduits 33, 36, and 39) together serve to redirect the flow stream, based on signals received from the sensors, from a service-needed fluid processing media to a service-ready fluid processing media without taking the system offline.

Figure 4:
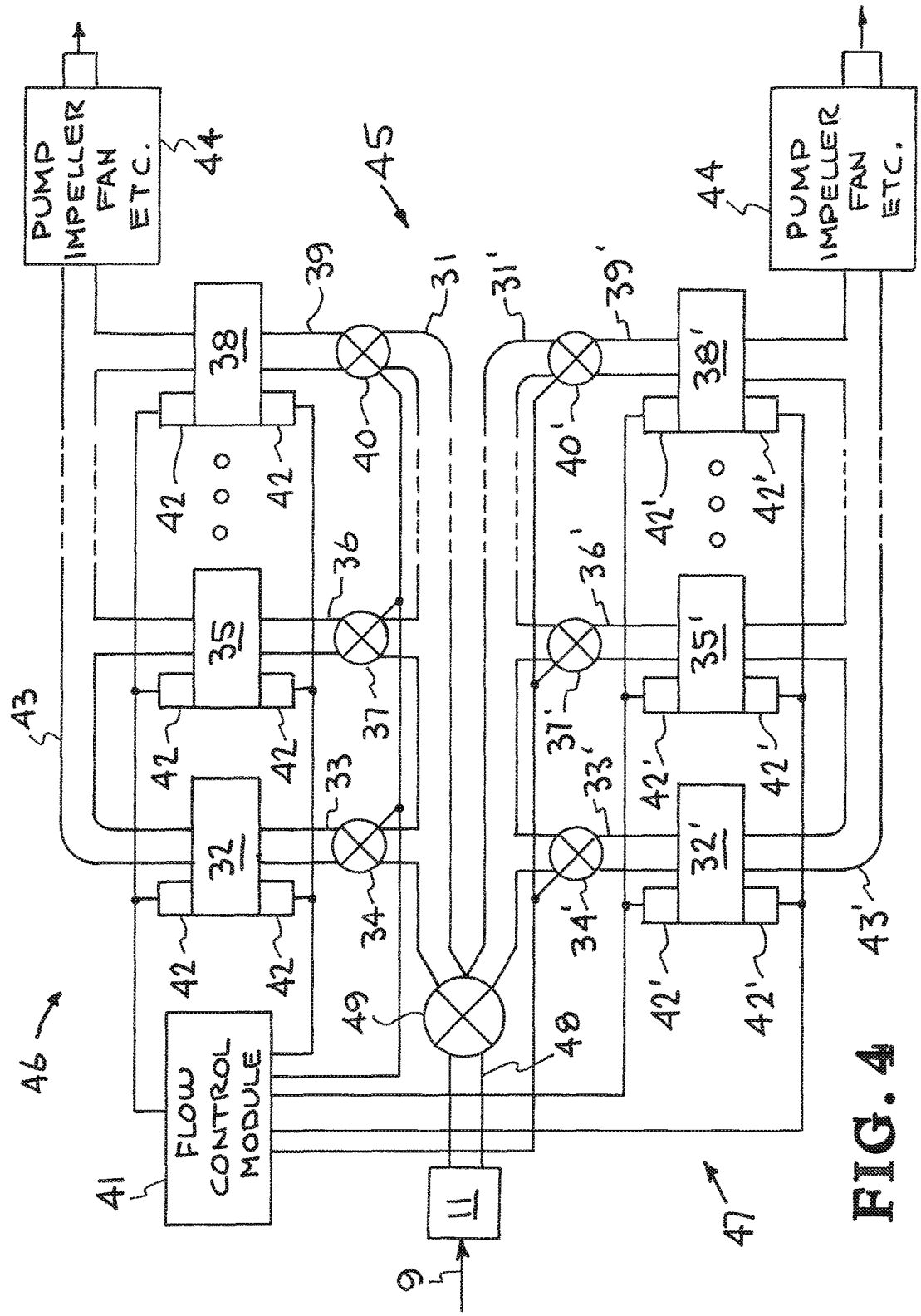
FIG. 4 is a schematic view of another example embodiment of the continuously-operable fluid processing system of the present invention having two representative banks of fluid processing media, with each bank having three representative fluid processing media arranged in parallel, similar to FIG. 3.

FIG. 4 shows another example embodiment of the continuously-operable fluid processing system of the present invention, generally indicated at 45, and having multiple (e.g. two) banks of fluid conduits/processing media, with a first bank generally indicated at 46 having a similar parallel arrangement as shown in FIG. 3, and a second bank generally indicated at 47. As can be seen in FIG. 4, the two banks 46 and 47 are particularly illustrated as being mirror images of each other, for convenient referencing. As such, reference characters of component elements of the second bank 47 are indicated with a prime (') designation, as being a mirrored counterpart of a corresponding component element of the first bank 46. It is appreciated however, that the multiple bank arrangement of the present invention need not be identical or symmetric, and may be customized with any number of the conduits/media per bank, sizing of media, and/or number of total banks, for a particular application requiring any number of redundancies and operating parameters. Also, while two separate flow sources 44 and 44' are shown, one for each bank, it is appreciated that a single flow source may be used with the downstream conduits of each bank converging downstream of the media.

In any case, the main conduits 31 and 31" of the banks 46 and 47 branches from and is in fluidic communication with the fluid inlet 11 via a two-way diverter valve 49. The valve 49 is connected to and controlled by flow control module 41 to selectively switch the flow stream 9 entering the system through fluid inlet 11 into one of the two main conduits 31 and 31'. In this manner, flow control may be at the bank level, with the flow control module 41 allowing flow into only one bank at any given time. Furthermore, the flow control module 41 may be particularly adapted to control the valves of the online bank so that at least one of the service-ready fluid processing media of the online bank is online and continues to process the flow stream while all of the fluid processing media of at least one of the other banks is offline so as to be serviceable. In an alternative embodiment, not shown in the drawings, flow into each of the main conduits 31 and 31' may be separately and independently controlled by different valves, whereby one or both banks may be online to process the flow stream, with at least one media, from the two banks together, remaining offline and serviceable. In either case, automatic operation of the system to redirect the flow stream to one or more service-ready media may be based on input signals provided to the flow control module 41 by sensors 42 and 42' shown arranged upstream and downstream of each media, to operate as previously described in FIG. 3.

Figure 5:
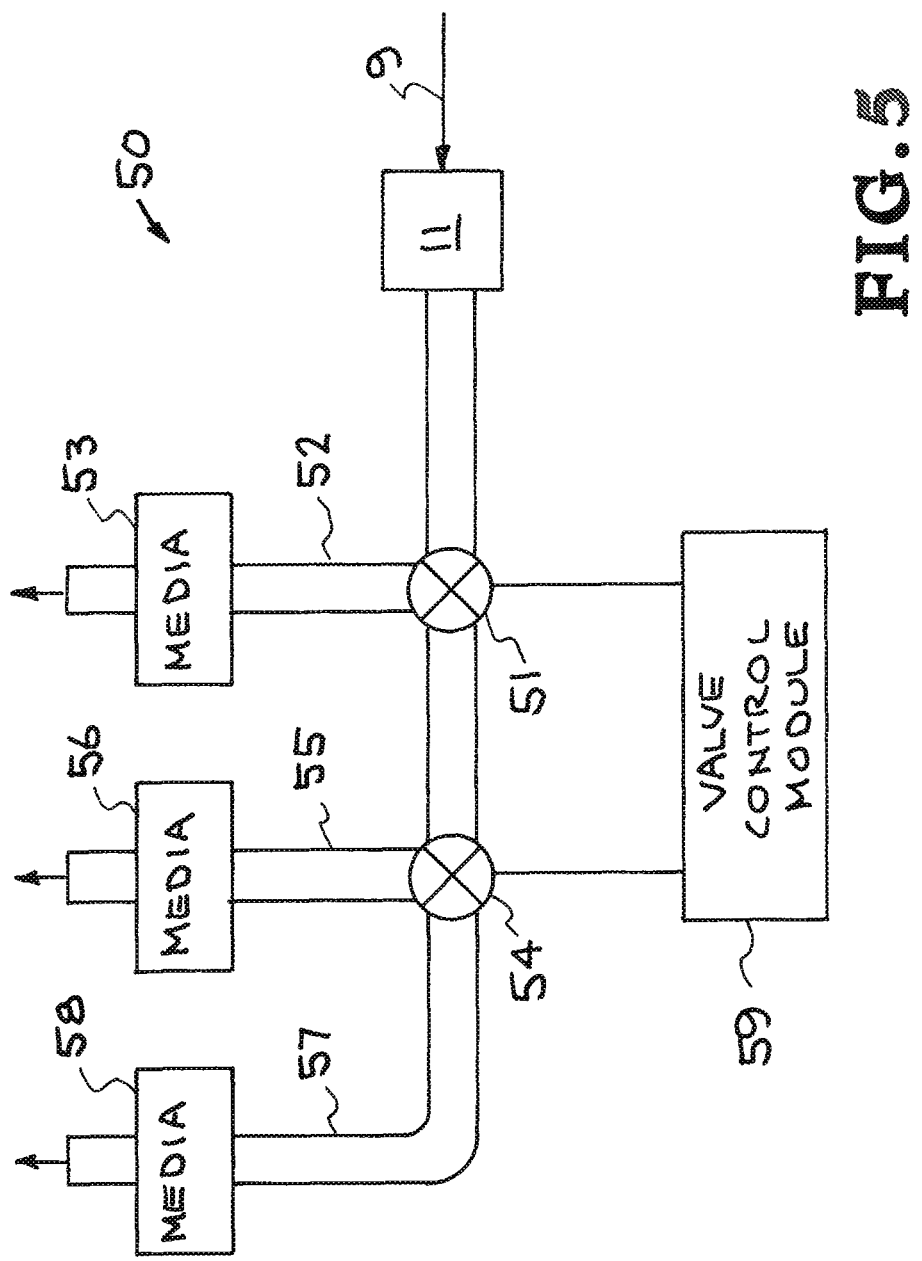
FIG. 5 is a schematic view of another example embodiment of the continuously-operable fluid processing system of the present invention having three representative fluid processing media arranged in parallel, with two diverter valves arranged in series to direct flow to one fluid processing media at a time.

FIG. 5 shows another example embodiment of the continuously-operable fluid processing system of the present invention, generally indicated at 50, and having three representative fluid processing media 53, 56, and 56 located in respective fluid conduits 52, 55, and 57 shown arranged in parallel. However, the three fluid conduits are also arranged in cascade arrangement such that a flow stream 9 entering the system through inlet 11 is selectively switched between the conduit 52 and all other conduits via two-way diverter valve 51 at a first level junction, and between conduits 55 and 56 via two-way diverter valve 54 at a second level junction. It is notable that additional downstream junctions for systems having additional media and associated conduits will have their own two-way diverter valve switching between subsequent fluid conduits and the main conduit. And the last, i.e. furthest downstream, two-way diverter valve at the last junction however will switch the between the penultimate and last fluid conduits. In this arrangement, diverter valve 51 operates as a first level switch valve and diverter valve 54 operates as a second level switch valve which can switch the flow stream only when the flow stream is switched to it by diverter valve 51, with both valves 51 and 52 connected to and controlled by valve control module 59. As such, flow through the three media may occur only one at a time, similar to the arrangement described in FIG. 2. In another example embodiment, flow may occur thru more than one conduit simultaneously, for example, including flow through all fluid conduits (e.g., 52, 55, and 57), where each of the valves 51 and 54 are capable of being switched to a third setting which opens communication to both paths/conduits downstream of the valve simultaneously instead of opening to just one at a time. Nonetheless, the valve control module 59, the valves 51 and 54 and the cascaded fluid conduit network (including the three branching conduits 52, 55, and 57) together serve to redirect the flow stream from a service-needed fluid processing media to a service-ready fluid processing media without taking the system offline.

Figure 7A:
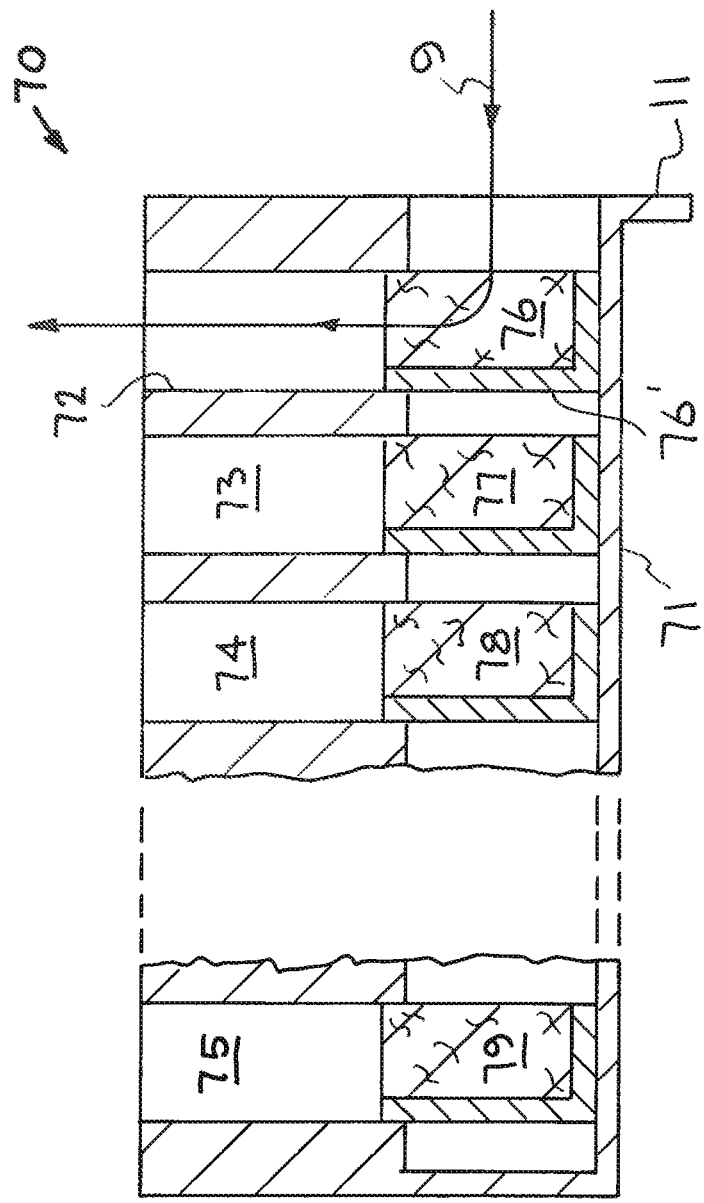
FIG. 7A is a schematic view of another example embodiment of the continuously-operable fluid processing system of the present invention having four representative fluid processing media serially arranged along a fluid conduit so that only the fluid process media located furthest upstream when actuated into the online position processes the flow stream.
Figure 7B:
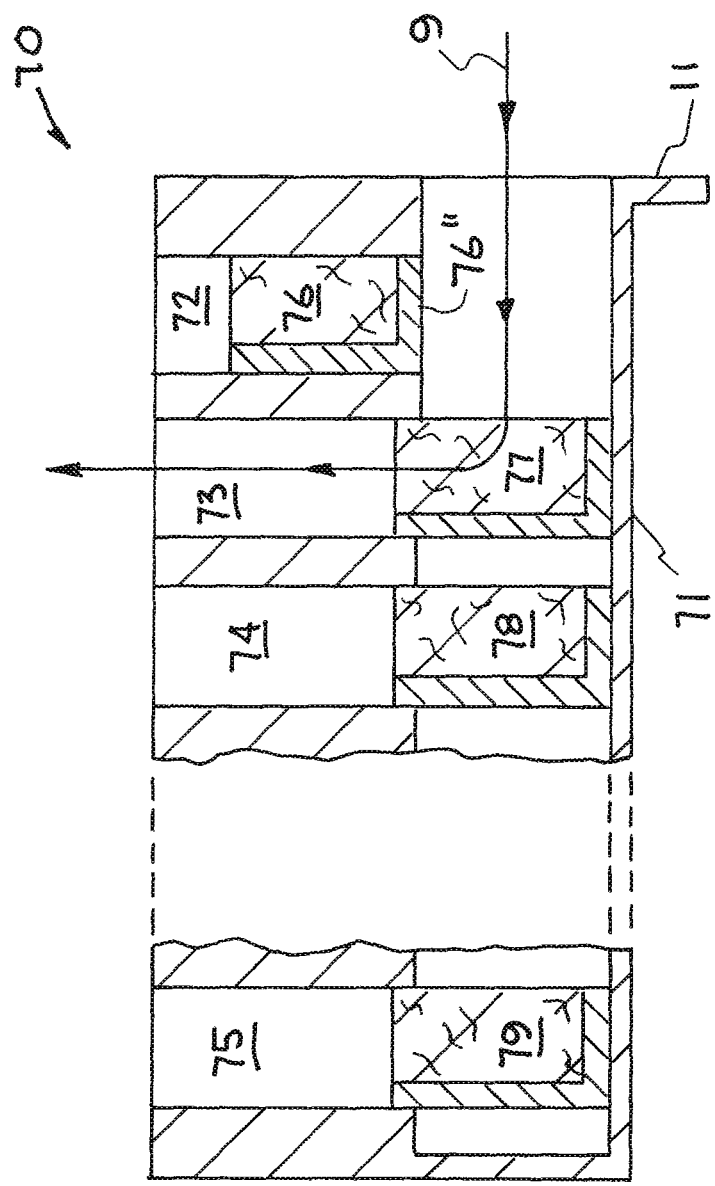
FIG. 7B is a schematic view following FIG. 7A after the media located further upstream is moved out of the flow stream to an offline position so that the media that is next in line and in the online position processes the flow stream.
Figure 8:
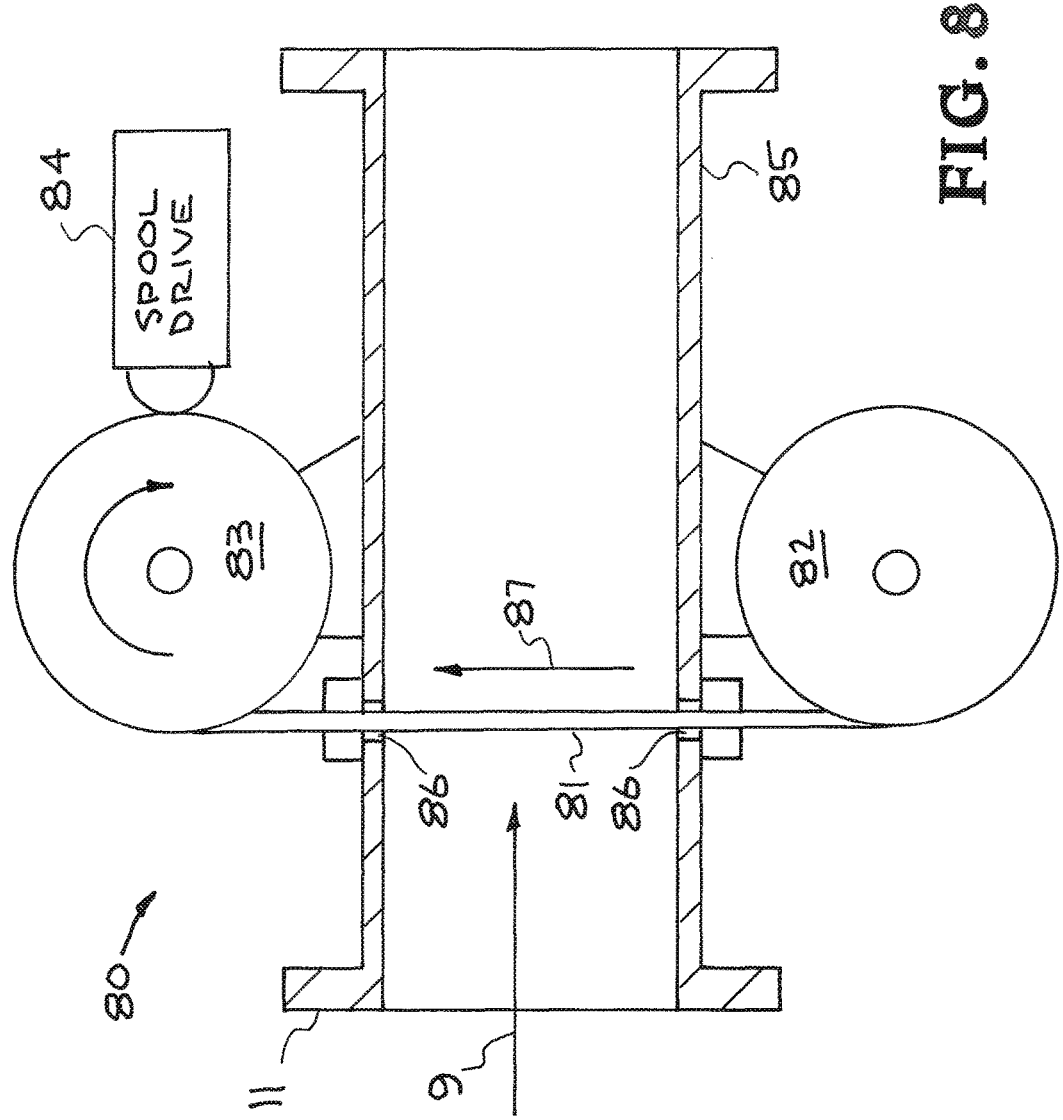
FIG. 8 is a schematic view of another example embodiment of the continuously-operable fluid processing system of the present invention having a continuous sheet of connected sections of fluid processing media.

And FIGS. 6-8 show various embodiments of the continuously-operable fluid processing system of the present invention, all of which incorporate fluid processing media adapted to be actuable between an online position capable of being exposed to the flow stream for processing the flows stream, and an offline position removed from processing the flow stream. Arranged in this manner, multiple fluid processing media may be alternatingly deployed, i.e. actuated into online position, between service-need media and service-ready media.

FIGS. 6A and 6B in particular show another example embodiment of the continuously-operable fluid processing system of the present invention, generally indicated at 60, and having and inlet 11 for receiving a flow stream 9 into the system, a flow conduit 61 connected to the inlet, and three fluid processing media 62, 63, and 64 serially arranged along the conduit 61. In particular, the media 62, 63, and 64 are hingedly connected to the conduit at respective hinges 62', 63', and 64', so as to be actuable by actuators 65, 66, and 67 connected to the media 62, 63, and 64, respectively, between an offline position positioned against the sidewall of the conduit where it is removed from processing the flow stream, and an online position where it is capable of being exposed to and directly impinged by the flow stream for processing the flow stream. Each media is independently actuable so that one or more media may be in the online position to process the flow stream, with at least one kept offline as a service-ready media to be immediately available for continuous operation. An actuator controller 68 is shown connected to the actuators 65-67 to independently actuate each of the media. In particular, FIG. 6A shows media 62 which is located further upstream, actuated in the online position, with downstream media 63 and 64 both in the offline position. Next in FIG. 6B, the previously online media 62 is now shown in the offline position, and the next in line media 63 is shown actuated into the online position. To ensure continuous operation, the actuator controller is adapted/configured to actuate at least one of the media into the online position prior to actuating the online media into the offline position. It is appreciated that while the media are particularly shown in FIGS. 6A and 6B as being hingedly connected to the conduit to enable actuation between online and offline positions, other methods of actuation/displacement may be used in the alternative. For example, media may be serially arranged along the conduit and adapted to be inserted into and out of the conduit either manually or via an actuator mechanism(s).

FIGS. 7A and 7B show another example embodiment of the continuously-operable fluid processing system of the present invention, generally indicated at 70, and having fluid processing media, such as 76-69, serially arranged along a fluid conduit 71 so that only the fluid process media located furthest upstream when actuated into the online position processes the flow stream. In particular, each fluid processing media is particularly adapted to be actuable between an online position capable of simultaneously processing and diverting/channeling the flow stream 9 (entering the inlet 11) into a conduit associated with the media. As such, a discrete diverter valve is not necessary given that actuation of the media provides valving action. For example, FIG. 7A shows all media 76-79 in an online position, but only media 76 that is positioned furthest upstream operating to process the flow stream. This can be seen as being due to media wall section 76' occluding flow downstream to the second and further downstream-located media, while simultaneously opening a flow path into conduit 72. Thus, while each of media 77-79 is capable of being exposed to the flow stream in the online position, it is not actually exposed to the flow stream until all upstream located media are in an offline position. Next in FIG. 7B, media 76 is shown retracted into flow conduit 72 so as to occlude flow into conduit 72 due to media wall section 76", while simultaneously opening a flow path downstream to media 77 which diverts and channels the flow stream into conduit 73.

Arranged in this manner, flow through the media in the system 70 of FIG. 7 may occur only one at a time, similar to the arrangements described in FIGS. 2 and 5. Nonetheless, the fluid conduit 71 and the individually actuable media together serve to redirect the flow stream 9 from a service-needed fluid processing media to a service-ready fluid processing media without taking the system offline. While not shown in FIG. 7, it is appreciated that the system 70 may also include a flow control module operably connected to each of the actuable media and otherwise adapted to automatically actuate the media based on a threshold condition, such as for example may be determined from measured parameter values obtained from sensors, also not shown, so that one of the service-ready fluid process media remains online and continues to process the flow stream while at least one of the other fluid processing media is offline so as to be serviceable.

In another example embodiment of the continuously-operable fluid processing system of the present invention, the fluid processing media may be serially connected and arranged so that removing a service-needed fluid processing media from an online position in the fluid conduit simultaneously advances an offline service-ready fluid processing media into the online position to continue to process the flow stream during and after media removal. In this manner, the media together exhibit a "one-in, one-out" operation by which a service needed media may be simultaneously removed and replaced by a service-ready media. For example, the serially connected media may be a continuous sheet (i.e. roll) of multiple sheet sections, or two edge-joined planar media capable of being reciprocated into and out of the conduit so that one of the media is in the conduit at all times.

FIG. 8 shows an example embodiment of the continuously-operable fluid processing system of the present invention, generally indicated at 80, and having such serially connected fluid processing media, shown particularly as a continuous sheet of flow processing media 81, also characterized as tape media. In particular, the system 80 is shown having an inlet 11 for receiving a flow stream 9 into a fluid conduit 85. The tape media 81 is shown rolled out from a source spool 82, positioned in and through the conduit 85 and taken up by take-up spool 83. Seals 86 are also shown provided along the entry and exit ports of the tape media, to prevent flow leakage therethrough. A spool drive 84 is shown operably connected to take-up spool 83 so as to drive the take-up spool in the direction indicated by arrow 87 and collect a service-needed section of the tape media that was advanced out of the conduit 85. By advancing the tape media to remove the service-need section, an adjoining service-ready section of the tape media is simultaneously advanced into the conduit to continue processing the flow stream without stoppage. It is appreciated that while the tap media is shown transversely positioned and advanced across the fluid conduit, in an alternative embodiment, the tape media may be advanced into and out of the conduit from substantially one side of the conduit. Furthermore, while not shown in the drawings, a sheet controller may also be provided and connected to the spool drive and otherwise adapted to advance the tape media into and out of the fluid conduit. Sensors (not shown) may also be used in this system 80, by which the sheet controller determines when to redirect the flow stream to a different service-ready section of the tape media.

Figure 9A:
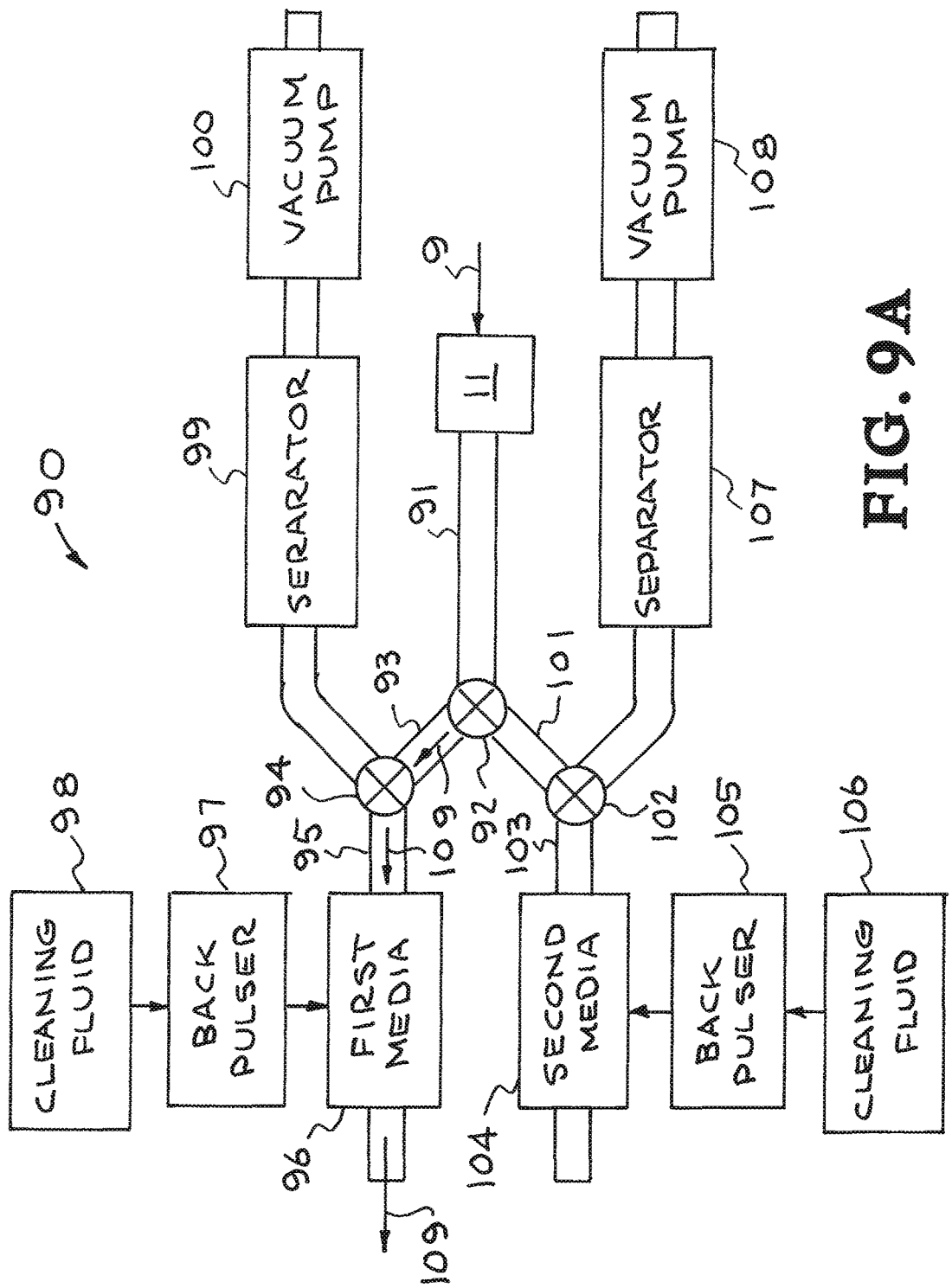
FIG. 9A is a schematic view of another example embodiment of the continuously-operable fluid processing system of the present invention having an online/in situ media cleaning arrangement, and particularly showing fluid processing by a first fluid processing media.
Figure 9B:
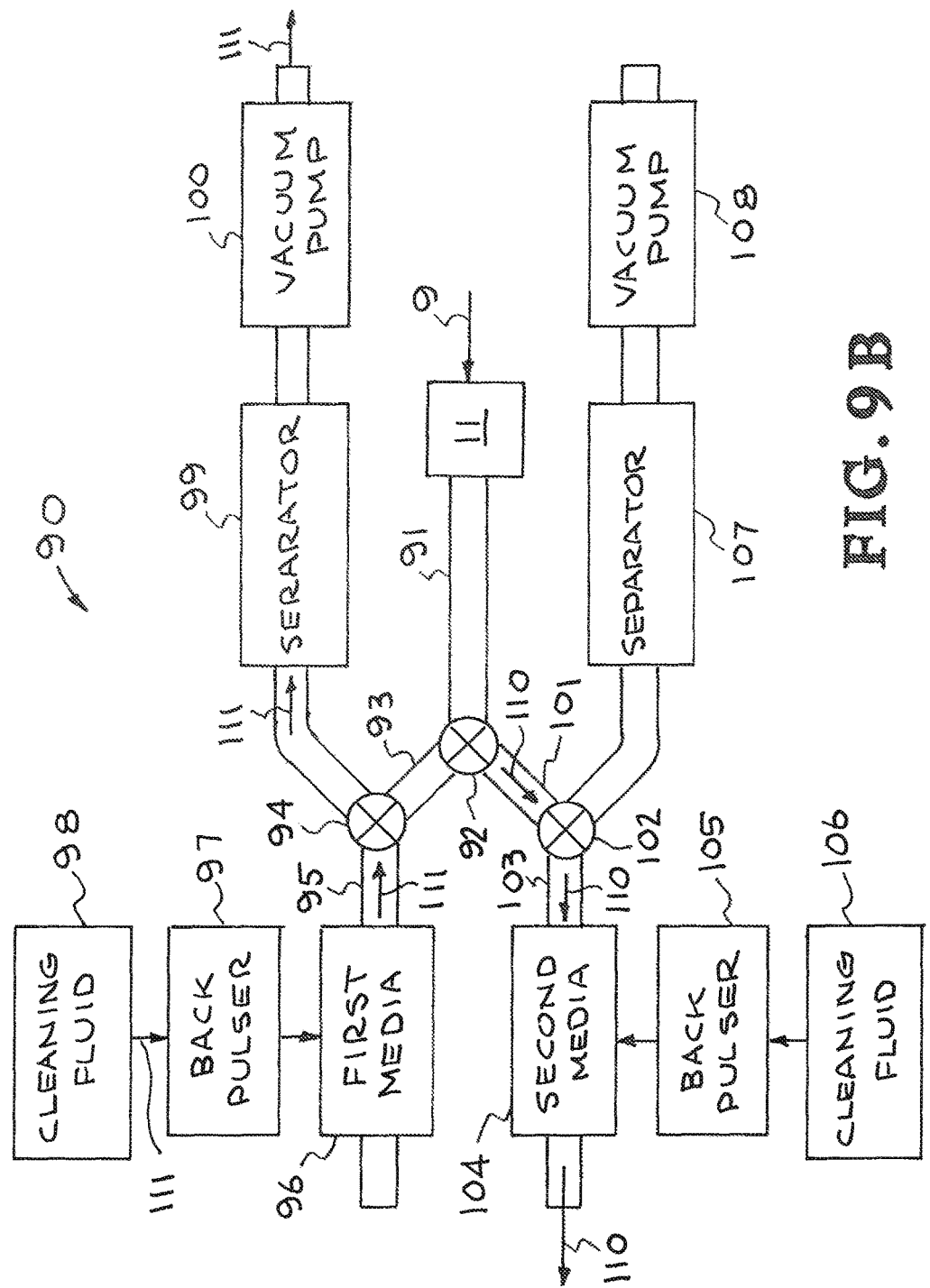
FIG. 9B is a schematic view following FIG. 9A after fluid flow is redirected from the first fluid processing media to a second fluid processing media, to enable in situ cleaning of the first media which the second media continues to process the fluid.

FIGS. 9A and 9B show a schematic view of another example embodiment of the continuously-operable fluid processing system of the present invention, generally indicated at 90, that is arranged to perform in situ cleaning of fluid processing media taken offline from processing the flow stream, while the system 90 continues to operate and process a flow stream 9 entering the system via fluid inlet 11. The system 90 is shown having two representative fluid processing media 96 (e.g. first media) and 104 (e.g. second media) arranged in parallel in respective flow conduits 95 and 103 with the flow conduits 95 and 103 branching from and in fluidic communication with the inlet 11. In particular, flow conduit 95 is fluidically connected to inlet 11 via a main conduit 91, branch conduit 93, and valves 92 and 94, and flow conduit 103 is fluidically connected to inlet 11 via the main conduit 91, branch conduit 101 and valves 92 and 102. Valve 92 is a two-way diverter valve for selectively switching the flow stream between the branching conduits 93 and 101. And valves 94 and 102 are also two-way diverter valves. In particular, valve 94 is arranged to selectively switch between branching conduit 93 and another conduit fluidically connected to a separator 99, for fluidic connection with conduit 95 and the first media 96. And valve 102 is similarly arranged to selectively switch between branching conduit 101 and another conduit fluidically connected to a separator 109, for fluidic connection with conduit 103 and the second media 104. It is appreciated that while two-way valves 92, 94, and 102 are described, n-way diverter valves connecting to each of n fluidic conduits to the common fluid inlet may be used.

Also shown in FIGS. 9A and 9B are a backpulser 97 (e.g. cleaning fluid injector) connected to backpulse and remove material from the first media 96 using a cleaning fluid (e.g. air) provided at 98, and a backpulser 105 connected to backpulse and remove material from the second media 96 using a cleaning fluid provided at 106. In this regard, and especially for ventilation systems, the media may be for example a backpulsable ceramic, steel, or other backpulsable HEPA filter. As shown in FIG. 9A, the cleaning fluid source and a fluid injector are arranged downstream of the offline fluid processing media in relation to an online flow path of the flow stream. Arranged in this manner, the backpulser 97 operates to inject the cleaning fluid from the cleaning fluid source to an outlet side of the offline fluid processing media and into the separator 99 for collection. The same is shown for backpulser 106 and cleaning fluid source 106 arranged to backpulse/inject cleaning fluid into an outlet side of media 104. Also provided are vacuum pumps 100 and 108, operably connected to separators 99 and 107, respectively. It is appreciated that while 97, 98 and 105, 106 are shown separately, the system may be plumbed so that backpulser 97 and 105 are the same backpulser unit, and cleaning fluid 98 and 106 may be the same cleaning fluid, and the vacuum pumps 100 and 108 may be the same unit.

Operation of the in situ cleaning arrangement begins in FIG. 9A where the first media is shown online and operating to process the flow stream 9, as indicated by arrows 109. Upon a determination that the first media is requiring service, or based on a predetermined maintenance criteria, valve 92 is controlled to redirect the flow stream 9 from the first media 96 to the second media 104 (including controlling valve 102) which is shown as being offline in FIG. 9A but online in FIG. 9B as indicated by flow arrows 110. After redirecting the flow stream 9 into the lower branch of the conduit network housing the second media, the upper branch of the network is offline and no longer exposed to the flow stream. Next the backpulser 97 is operated to inject cleaning fluid from the source 98 into the outlet side for the first media 96 and directed into the separator/collector 99. The flow of removed material into the separator is shown by arrows 111 and is produced by a fluid conveyance apparatus 100 (e.g. vacuum pump 100 as shown in the figure but other methods/devices of fluid conveyance are possible, e.g. fan, venturi, or gravity). It is appreciated that while backpulsing is particularly shown and described in FIGS. 9A and 9B, other methods of removing material from the offline media (e.g. washing) may be employed, as described in the Summary. It is appreciated that while 99, 100 and 107, 108 are shown separately, the system may be plumbed so that separator 99 and 107 are the same separator unit, and fluid conveyance apparatus (e.g. pump) 100 and 108 may be the same fluid conveyance apparatus (e.g. pump).

While not shown in the drawings, an alternative in situ cleaning arrangement has the separator positioned downstream of the media, and not upstream (relative to the flow stream direction) as shown in FIGS. 9A and 9B. And a two-way diverter valve positioned between the media and the downstream separator would operate to selectively switch the flow stream from the media either into the separator or the exit conduit of the original flow path. Furthermore, in this arrangement the media is particularly adapted to be reversed in direction in the fluid conduit, so that its inlet and outlet ends/sides are reversed. In this manner, the flow stream 9 from the inlet 11 may be utilized as the cleaning fluid and directed into the outlet end/side of the media, and the removed material collected into the downstream separator. In this manner, the separator may be operably positioned in the downstream location relative to the media, as well as the upstream location relative to the media as discussed for FIGS. 9A and 9B. It is appreciated that while two-way valves are described, n-way diverter valves connecting to each of n fluidic conduits to the common fluid inlet may be used.

While particular embodiments, forms, and parameters of the invention have been disclosed, described and/or illustrated, such are not intended to be limiting. The invention covers all modifications, equivalents, and alternatives which may become apparent to those skilled in the art, and/or falling within the spirit and scope of the invention as defined in the appended claims, and it is intended that the invention be limited only by the scope of the appended claims.

We claim:

1. A continuously-operable flow stream processing system comprising:
   a fluid inlet for receiving a flow stream into the system;
   at least two fluid processing media;
   a fluid conduit in fluidic communication with the fluid inlet, with the fluid-processing media serially arranged along the fluid conduit so that each fluid processing media is independently actuable between an online position for processing the flow stream and an offline position removed from processing the flow stream; and
   a flow controller adapted to independently actuate the serially arranged fluid processing media between the online position and the offline position so that a service-ready fluid process media remains online and continues to process the flow stream while the other fluid processing media is offline so as to be serviceable without taking the system offline to service a service-needed fluid processing media, whereby the system may operate continuously to process the flow stream without stoppage.

2. A continuously-operable flow stream processing system, comprising:

a fluid inlet for receiving a flow stream into the system;
at least two fluid processing media;
at least two fluid conduits branching from and in fluidic communication with the fluid inlet, wherein for each fluid conduit, an associated one of the fluid processing media is positioned therein to process the flow stream when directed through said fluid conduit;
a valve operably connected inline with the conduits;
a flow controller adapted to control the valve to selectively switch the flow stream between the conduits and between service-needed fluid processing media and service-ready fluid processing media so that at least one of a service-ready fluid processing media is online and continues to process the flow stream while at least one of the other fluid processing media is offline so as to be serviceable without taking the system offline to service the service-needed fluid processing media, whereby the system may operate continuously to process the flow stream without stoppage; and
means for in situ cleaning of offline fluid processing media including, means for removing material from the offline fluid processing media, a separator for collecting the removed material from the offline fluid processing media; and a flow diverter adapted to control fluid communication between the offline fluid processing media and the separator,
wherein the means for removing material from the offline fluid processing media includes a cleaning fluid source and a fluid injector arranged downstream of the offline fluid processing media in relation to an online flow path of the flow stream to inject the cleaning fluid from the cleaning fluid source to an outlet side of the offline fluid processing media and into the separator for collection.

3. A continuously-operable flow stream processing system, comprising:
a fluid inlet for receiving a flow stream into the system;
at least two fluid processing media;
at least two fluid conduits branching from and in fluidic communication with the fluid inlet, wherein for each fluid conduit, an associated one of the fluid processing media is positioned therein to process the flow stream when directed through said fluid conduit;
a valve operably connected inline with the conduits;
a flow controller adapted to control the valve to selectively switch the flow stream between the conduits and between service-needed fluid processing media and service-ready fluid processing media so that at least one of a service-ready fluid processing media is online and continues to process the flow stream while at least one of the other fluid processing media is offline so as to be serviceable without taking the system offline to service the service-needed fluid processing media, whereby the system may operate continuously to process the flow stream without stoppage; and
sensors positioned to directly monitor the fluid processing media,
wherein the flow controller is adapted to determine that a currently online fluid processing media is in need of servicing based on a predetermined threshold condition detected by the sensors, and based on said determination to control the valve to selectively switch the flow stream from the service-needed fluid processing media to a service-ready fluid processing media without taking the system offline so that at least one of the service-ready fluid processing media is online and continues to process the flow stream while at least one of the other fluid processing media is offline so as to be serviceable.

4. A method of continuously processing a flow stream comprising:
providing a system having a fluid inlet for receiving a flow stream, at least two fluid processing media, and a fluid conduit in fluidic communication with the fluid inlet, with the fluid processing media serially arranged along the fluid conduit so that each fluid processing media is independently actuable between an online position for processing the flow stream and an offline position removed from processing the flow stream; and
independently actuating the serially arranged fluid processing media between the online position and the offline position so that a service-ready fluid process media remains online and continues to process the flow stream while the other fluid processing media is offline so as to be serviceable without taking the system offline to service a service-needed fluid processing media, whereby the system may operate continuously to process the flow stream without stoppage.

5. A method of continuously processing a flow stream comprising:
providing a fluid inlet for receiving a flow stream, at least two fluid processing media, at least two fluid conduits branching from and in fluidic communication with the fluid inlet, wherein for each fluid conduit, an associated one of the fluid processing media is positioned to process the flow stream when directed through said fluid conduit, and a valve operably connected inline with the conduits;
using a flow controller to control the valve to selectively switch the flow stream between the conduits and between service-needed fluid processing media and service-ready fluid processing media so that at least one of a service-ready fluid processing media is online and continues to process the flow stream while at least one of the other fluid processing media is offline so as to be serviceable without taking the system offline to service the service-needed fluid processing media, whereby the system may operate continuously to process the flow stream without stoppage; and
in situ cleaning offline fluid processing media by removing material from the offline fluid processing media, using a separator to collect the removed material from the offline fluid processing media; and using a flow diverter to control fluid communication between the offline fluid processing media and the separator,
wherein the removal of material from the offline fluid processing media includes providing a cleaning fluid source and a fluid injector arranged downstream of the offline fluid processing media in relation to an online flow path of the flow stream, and using the fluid injector to inject the cleaning fluid from the cleaning fluid source to an outlet side of the offline fluid processing media and into the separator for collection.

6. A method of continuously processing a flow stream comprising:
providing a fluid inlet for receiving a flow stream, at least two fluid processing media, at least two fluid conduits branching from and in fluidic communication with the fluid inlet, wherein for each fluid conduit, an associated one of the fluid processing media is positioned to process the flow stream when directed through said fluid conduit, and a valve operably connected inline with the conduits;

using a flow controller to control the valve to selectively switch the flow stream between the conduits and between service-needed fluid processing media and service-ready fluid processing media so that at least one of a service-ready fluid processing media is online and continues to process the flow stream while at least one of the other fluid processing media is offline so as to be serviceable without taking the system offline to service the service-needed fluid processing media, whereby the system may operate continuously to process the flow stream without stoppage; and providing sensors positioned to directly monitor the fluid processing media, wherein the flow stream is redirected from service-needed fluid processing media to service-ready fluid processing media without taking the system offline by using the flow controller to determine that a currently online fluid processing media is in need of servicing based on a predetermined threshold condition detected by the sensors, and based on said determination, to selectively switch the flow stream from the service-needed fluid processing media to a service-ready fluid processing media without taking the system offline so that at least one of the service-ready fluid processing media is online and continues to process the flow stream while at least one of the other fluid processing media is offline so as to be serviceable.

* * * * *